United States Patent [19]

Chana

[11] Patent Number: 5,335,341
[45] Date of Patent: Aug. 2, 1994

[54] DUMP ANALYSIS SYSTEM AND METHOD IN DATA PROCESSING SYSTEMS

[75] Inventor: Jit S. Chana, Totton, United Kingdom

[73] Assignee: International Business Machines Corporation, Armonk, N.Y.

[21] Appl. No.: 671,235

[22] Filed: Mar. 19, 1991

[30] Foreign Application Priority Data

Dec. 20, 1990 [GB] United Kingdom ............ 9027630.4

[51] Int. Cl.$^5$ ............................................. G06F 11/00
[52] U.S. Cl. .................................. 395/575; 371/16.5; 371/12
[58] Field of Search ................. 395/575; 371/16.5, 12, 371/15.1

[56] References Cited

U.S. PATENT DOCUMENTS 5,084,875  1/1992  Weinberger et al. ............... 371/29.1
5,101,494  3/1992  Bilski et al. .......................... 395/700
5,111,384  5/1992  Aslanian et al. ..................... 395/575

FOREIGN PATENT DOCUMENTS 0261690   3/1988  European Pat. Off. ....... G06F 9/44
WO8606519 11/1986 World Int. Prop. O. ... G06F 11/22

*Primary Examiner*—Robert W. Beausoliel, Jr.
*Assistant Examiner*—Ly V. Hua
*Attorney, Agent, or Firm*—William B. Porter

[57] ABSTRACT

A data processing system operates under the control of a control program having one or more versions. System dump data is generated on occurrence of an error condition. A dump analysis routine for analyzing dump data indicative of the error state of the system receives constant-format data from a version of a translation routine, the translation routine having one or more versions each corresponding to a version of the control program, and capable of translating the system dump data into the constant format required by the dump analysis routine.

10 Claims, 3 Drawing Sheets

DUMP ANALYSIS SYSTEM AND METHOD IN DATA PROCESSING SYSTEMS

BACKGROUND OF THE INVENTION

1. Field of the Invention

The present invention relates to data processing systems, and more particularly to dump analysis in such a system.

2. Background Art

When a program is executing on a data processing system, occasionally an error condition may arise which is so serious as to stop the execution of the program. Such an error, known colloquially as a system 'crash', may be connected with the system hardware, storage, or operating system, or with the program itself. The error may result directly in termination of the program (for example, a major hardware failure or programing error) or instead might cause a self-checking routine to terminate the program on the grounds that the error condition is such that the program's results are no longer reliable.

When a crash occurs, a known diagnostic routine can be used to provide detailed information relating to the state of the data processor at the time of the crash. This information, known as the 'dump', would commonly include a detailed listing of the contents and logical interrelationships of all the storage areas used by the program and/or the operating system. In the case of a large, complex program such as the IBM CICS/MVS program, the dump may be very large indeed, typically producing several hundred pages of printout. (IBM and CICS/MVS are trademarks of the International Business Machines Corporation.)

Traditionally, following a crash, an operator would manually sift through a printout of the dump, trying to discover one or more symptoms indicating the cause of the crash. Clearly, this procedure is very time-consuming and can require a large number of skilled and experienced operators. More recently, examination of the dump has been automated, in that procedural or knowledge-based dump analysis tools have been developed to examine predetermined features of the dump. These tools are based upon the operators' experience of common causes of crashes for the particular combination of programs and data processor in use.

Although dump analysis has been described above with regard to recovery and diagnostics following a system crash, it is also common for dump analysis to be performed at intervals when the system is working correctly. For example, dump analysis could be performed to assess the usage of the system storage or other resources, or to discover the number and processing requirements of the system users.

A problem arises when the program or programs in use are modified or updated. Although the dump produced when the updated program is in use may contain the same information as before, it may be expressed in a different order or in a different format. It is then necessary to rewrite at least a part of the dump analysis tool in order to access the required data from the dump. Because the analysis tools are developed based on the operators' experience with a particular data processor configuration, they are usually unique to the data processor with which they are used. Therefore the tool associated with each individual data processor must be updated whenever the programs used with that data processor are updated.

Clearly, if the tools are modified at each data processor and for each program update, there is a significant chance that the modified tools may contain programming errors. Also, it is wasteful of resources to repeat the same or very similar modifications at a large number of individual sites.

SUMMARY OF THE INVENTION

According to this invention there is provided a data processing system, operating under the control of a program, which includes means for providing information indicative of the state of the data processing system; a translation mechanism, related to the program and responsive to a request from an analysis program, accesses the information and provides selected items of the information in a format constant between different versions of the first mentioned program, for processing by the analysis program.

The invention solves the problem of having to update the analysis tool on each data processor whenever the program in use on that data processor is updated. When a program update is applied, no changes need be made to the analysis tool itself; instead, a similar update is applied to the accessing means. The translation mechanism accepts commands in a predetermined format, accessing variable format data, and returning the required data items in the predetermined format such as that required by the analysis tool.

In the case of a program update supplied by a single originator to several data processors, the work required to update the accessing means need only be done by the originator of the program update. Individual analysis tools dedicated to the processor configuration at each site need not be updated.

Obviously, a particular new version of the program may give rise to a dump so completely different from that produced by the previous versions that the balance of convenience means that a fresh analysis tool should be created. However, in its broadest aspect, the translation mechanism provides the selected items of information in a format which is constant between at least two versions of the program.

In a preferred embodiment, the information indicative of the state of the system (the dump) is provided following an error condition causing termination of the program, and is indicative of the state of the data processing system at the time of the error condition.

It is preferred that the requests from the analysis program are made in a format which is constant between different versions of the first mentioned program.

In the case in which the data processing system includes storage means (such as disc storage) organized as a plurality of storage areas, it is preferable that the information in the dump is indicative of the contents and logical interrelationships of storage areas accessed by the first mentioned program.

The present invention also provides accessing means for use in a data processor operating under the control of a program, comprising means, responsive to a request from an analysis program, for accessing information indicative of the state of the data processor and providing selected items of said information in a format constant between different versions of the first mentioned program.

DESCRIPTION OF THE PREFERRED EMBODIMENT

Figure 1:
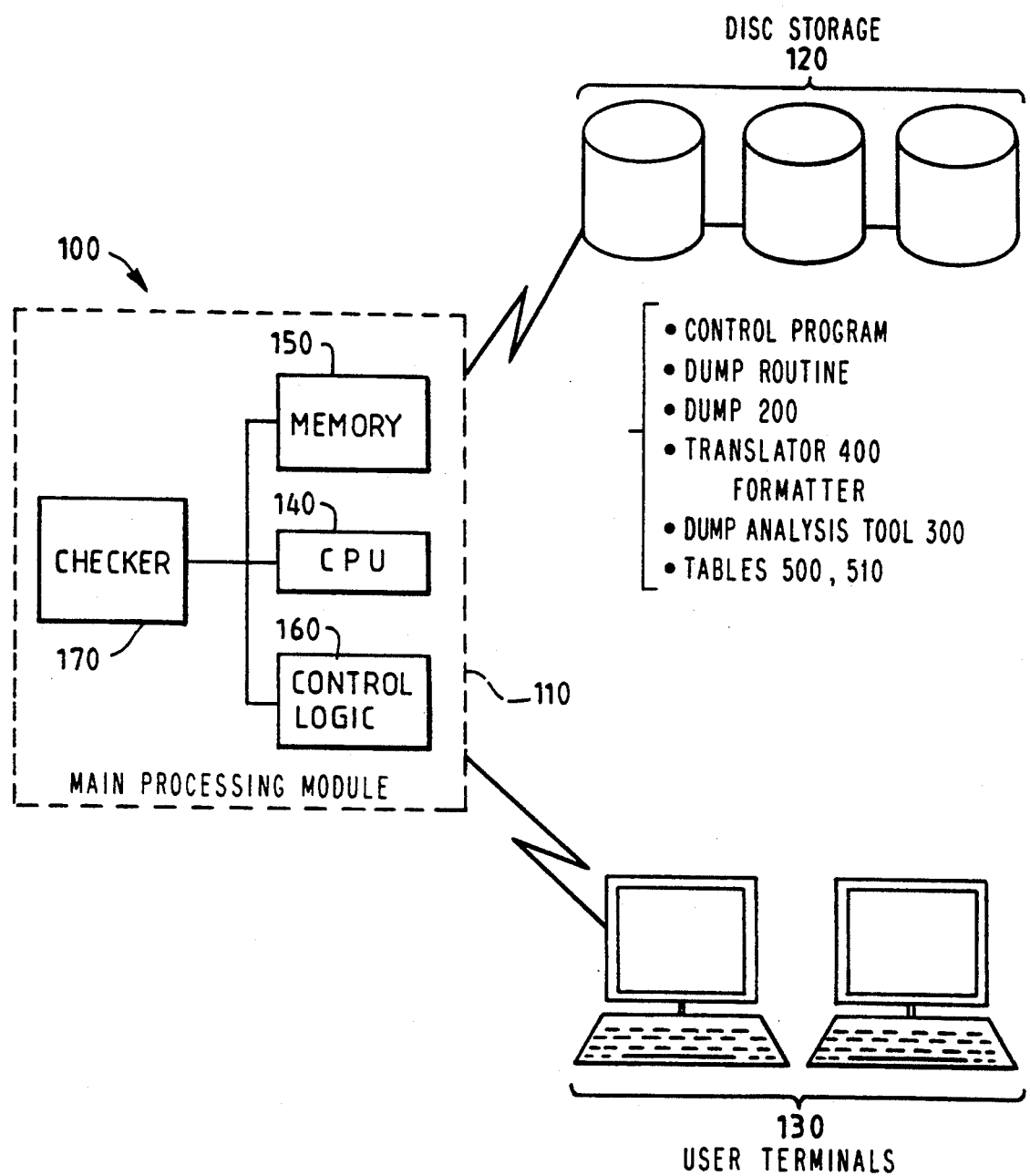
FIG. 1 is a schematic representation of a data processing system for use in the present invention.

Refer now to FIG. 1 which shows a data processing system 100 in schematic form. The system 100 comprises a main processing module 110, nonvolatile storage such as disc storage 120, and one or more user terminals 130. The processing module 110 comprises a central processor unit (CPU) 140, further storage such as random access memory 150, and control logic 160.

During execution of a program on the data processing system, a system error may occur and cause the termination of the program. As described above, such an error could be associated with the system hardware or software. The error may be sufficiently serious to terminate operation of the entire data processing system directly, or may be a more subtle error allowing operation to continue but casting doubt on the reliability and integrity of any output produced by the program. In the latter case, the error could be detected by checking routines or hardware, shown schematically (170) on FIG. 1, which would then terminate the execution of the program.

Figure 2:
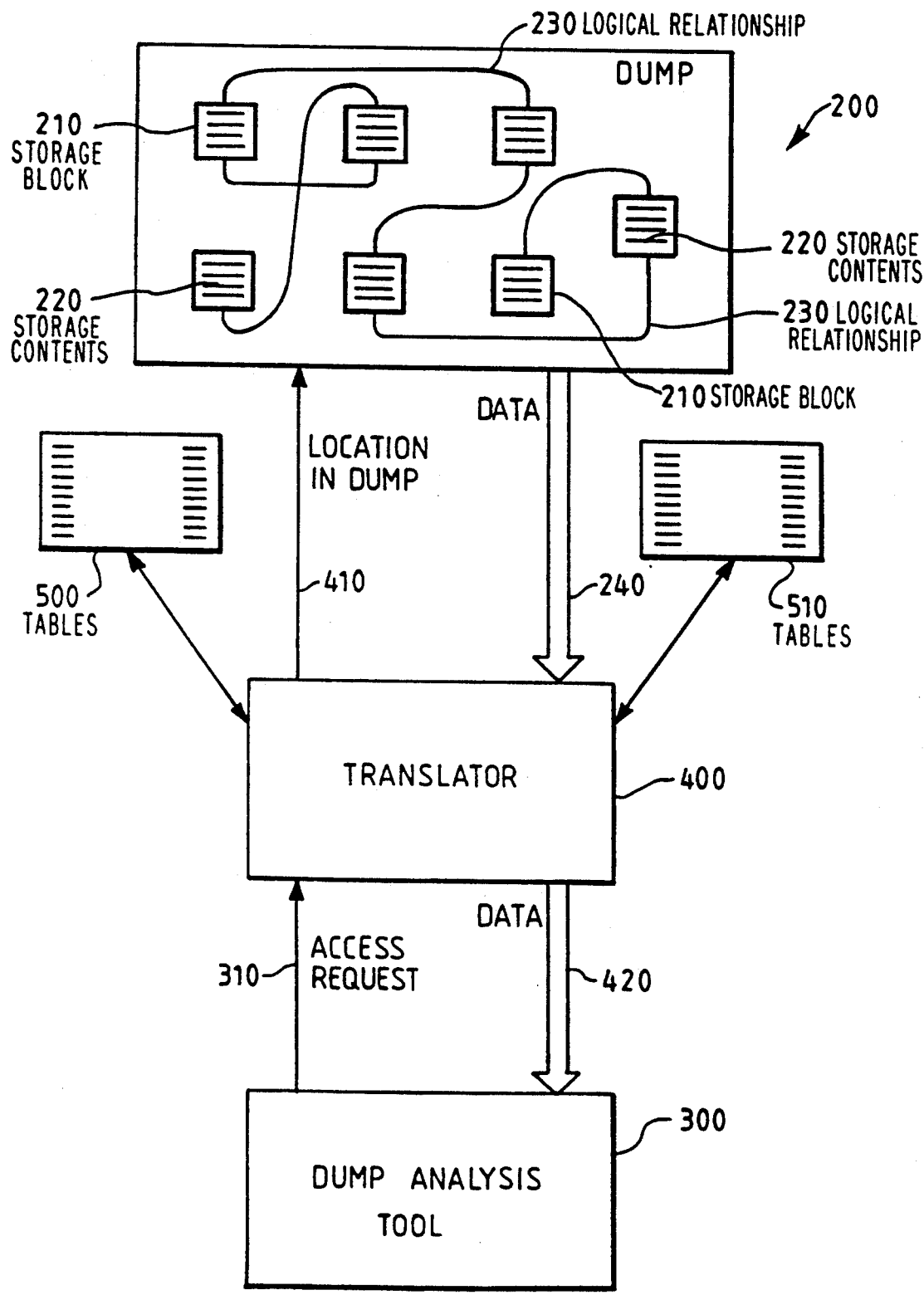
FIG. 2 is a block diagram showing the analysis of dump data according to the invention.

When the program is abnormally terminated following an error, a system dump is produced by a dump routine. The dump 200 is shown schematically in FIG. 2, and in the present embodiment is a list showing the contents 220 and the logical interrelationships 230 of each storage block 210 accessed by the program. As used in the present embodiment, dump 200 is stored in memory or disc storage.

The information provided in the dump is ultimately analyzed by the dump analysis tool 300. However, if the tool 300 were to access the dump 200 information directly, then each time the program was updated the tool 300 would need to be correspondingly updated. Instead, translator 400 is interposed between the analyzer 300 and the dump itself 200.

As stated above, dump analysis is also commonly performed for system audit purposes even though a crash has not occurred.

During analysis of the dump, when the analyzer requires a particular item of information, it sends a request 310 to the translator 400. These requests are made according to a predetermined format. With reference to tables 500 and 510, the translator determines the location in the dump 200 of the data item required by the analyzer. The translator obtains data 240 from the dump using the data location 410. If necessary, a formatter in translator 400 reformats the data into the format required by the analyzer. Translator 400 then sends the formatted data 420 to the analyzer. The operation of translator 400 will be described in greater detail with reference to FIG. 3 below.

Tables 500 and 510 can be dynamically varied since they are logically separate from the body of the translator 400. In fact, they are generated at the time the dump is first made available to the translator using the information in the dump and a subset of information held by the translator. It is this latter information which is updated when a new version of the program (producing a differently formatted dump) is installed.

FIG. 1 shows disc storage 120 storing the version of the control program, the dump routine, dump 200, translator 400 with its formatter, dump analysis tool 300, and tables 500 and 510. During execution of a program, the data processing system 100 makes these programs available to CPU 140 by selectively moving them into and out of random access memory 150 in a conventional manner. Similarly, system 100 normally places data producing during program execution, including dump 200 and tables 500 and 510, in memory 150 before final storage in disc storage 120.

Figure 3:
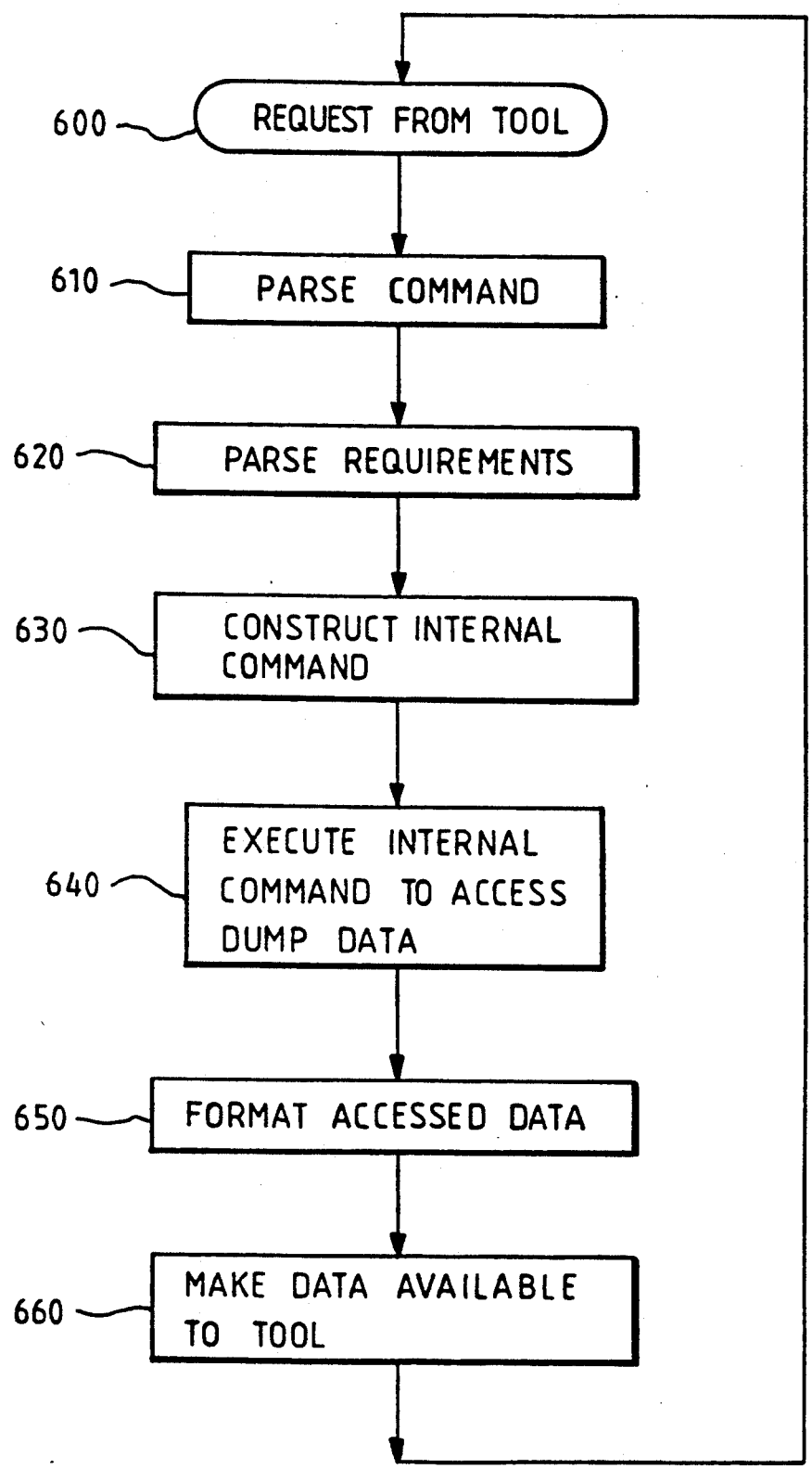
FIG. 3 is a flow diagram showing the operation of the translator.

FIG. 3 is a flow diagram showing the operation of translator 400. The first step 600 is for the translator to receive a command from the analyzer requesting a particular piece of data from the dump. In this embodiment, the command format is constant between different versions of the program. An example of such a command might be:

Get_System_Ctrl_Blk (Ctrl_Blk_Name, Field_Number)

This command, along with its two parameters, signifies that the analyzer requests an item of data stored in a storage area denoted by the label Ctrl_Blk_Name. In particular, the data stored in a single field in this area (denoted by the index Field_Number) is required.

When this command is received it is parsed 610, 620 by the translator. The translator first examines 610 the command itself ('Get_System_Ctrl_Blk' in the above example) to determine the nature of the data access required, and then examines the parameters ('Ctrl_Blk_Name' and 'Field_Number' in the example) to calculate the location in the dump of the required data item. To calculate this location, the translator first finds an entry in table 500 corresponding to the parameter 'Ctrl_Blk_Name'. This entry provides the location in the dump of the first data item in the storage area 'Ctrl_Blk_Name'. The translator then refers to offset table 510; in this table, the entry corresponding to the index 'Field_Number' provides an offset value which must be added to the location obtained from table 500 to obtain the location of the individual data item required.

In the present embodiment, the translator then constructs 630 an internal command to access the required data item, and then executes 640 this internal command. The data item obtained from the dump is formatted 650 by the formatter into a standard format acceptable by the analyzer, and is finally sent 660 to the analyzer.

When an update is made to one or more programs in use on the data processing system 100, the exact format of the data in the system dump may change. The dump analysis tool 300 need not be updated in these circumstances; instead, an update is made merely to the data from which tables 500 and 510 are produced (or even to the tables directly). If the program modification is supplied to several data processors by a single originator, these data revisions can be supplied and installed at the same time.

Although the invention has been described with reference to a particular embodiment, it will be clear that many changes in detail can be made without departing from the scope of the invention as claimed.

What is claimed is:

1. A data processing system, operating under control of a control program having different versions, said data processing system comprising:

A) means for generating information indicative of a state of the data processing system;
B) an analysis means for analyzing said state of said data processing system; and
C) accessing means for accessing said information and providing said information to said analysis means in a constant format in response to an access request transmitted from said analysis means to said accessing means, said accessing means having different versions, each of said versions of said accessing means corresponding to a corresponding different one of said versions of the control program.

2. The data processing system of claim 1 further including a checker means for detecting an error condition in said system that causes termination of said control program, and in which said means for generating information is responsive to said checker means, and in which said state is coincident in time with said error condition.

3. The data processing system of claim 2 in which said analysis program means transmits said access request such that said request is format invariant among said different versions of said control.

4. The data processing system of claim 3 further comprising storage means organized as a plurality of storage areas for storing said information in response to said control program so that said information is indicative of the contents and logical interrelationships of those of said plurality of storage areas accessed by said control program.

5. The data processing system of claim 2 further comprising storage means organized as a plurality of storage areas for storing said information in response to said control program so that said information is indicative of the contents and logical interrelationships of those of said plurality of storage areas accessed by said control program.

6. The data processing system of claim 1 in which said analysis means transmits said access request such that said request is format invariant among said different versions of said control program.

7. The data processing system of claim 6 further comprising storage means organized as a plurality of storage areas for storing said information in response to said control program so that said information is indicative of the contents and logical interrelationships of those of said plurality of storage areas accessed by said control program.

8. The data processing system of claim 1 further comprising storage means organized as a plurality of storage areas for storing said information in response to said control program so that said information is indicative of the contents and logical interrelationships of those of said plurality of storage areas accessed by said control program.

9. A method for analyzing system dump data in a data processing system operating under control of an operational version of a control program having different versions, said method comprising the steps of:
A) generating information indicative of a state of the data processing system;
B) providing a version of an accessing means, in which said accessing means has different versions, said version provided by said accessing means corresponding to the operational version of the control program; and
C) having said version provided by said accessing means access said information and provide said information to a requesting analysis program in a constant format.

10. The method of claim 9 in which said step of generating information is responsive to an error condition causing termination of said operational version of said control program.

* * * * *